United States Patent [19]

Watson et al.

[11] Patent Number: 5,485,697
[45] Date of Patent: Jan. 23, 1996

[54] FISHING LURE

[75] Inventors: Teddie G. Watson, Henderson, Nev.; Jeffrey L. Orth, Salt Lake City, Utah

[73] Assignee: Soundtech, Inc., Paso Robles, Calif.

[21] Appl. No.: 910,635

[22] Filed: Jul. 8, 1992

Related U.S. Application Data

[63] Continuation-in-part of Ser. No. 837,662, Feb. 14, 1992, Pat. No. 5,237,771, which is a continuation of Ser. No. 715,730, Jun. 17, 1991, abandoned, which is a continuation of Ser. No. 587,251, Sep. 24, 1990, abandoned, which is a continuation of Ser. No. 354,917, May 22, 1989, Pat. No. 4,960,437.

[51] Int. Cl.$^6$ .................................................. A01K 85/00
[52] U.S. Cl. ........................................ 43/42.31; 43/17.1
[58] Field of Search ........................... 43/17.1, 42.31, 43/26.2

[56] References Cited

U.S. PATENT DOCUMENTS

| | | | |
|---|---|---|---|
| 2,577,229 | 12/1951 | Carnes | 43/42.31 |
| 2,757,475 | 8/1956 | Pankove | 43/17.1 |
| 2,784,399 | 3/1957 | Smith | 43/17.1 |
| 2,920,318 | 1/1960 | Balcken | 43/17.1 |
| 2,932,110 | 4/1960 | Kilpinen | 43/42.31 |
| 3,068,604 | 12/1962 | Nyberg | 43/42.31 |
| 3,120,073 | 2/1964 | Brunton | 43/17.1 |
| 3,310,902 | 3/1967 | Godby | 43/17.1 |
| 3,416,254 | 12/1968 | Bornzin | 43/17.1 |
| 4,380,132 | 4/1983 | Atkinson | 43/42.31 |
| 4,583,313 | 4/1986 | Dugan | 43/17.1 |
| 4,625,446 | 12/1986 | Morimoto | 43/17.1 |
| 4,805,339 | 2/1989 | Fuentes et al. | 43/42.31 |
| 4,951,410 | 8/1990 | Ly | 43/17.1 |
| 4,960,437 | 10/1990 | Watson | 43/42.31 |

Primary Examiner—Kurt Rowan
Attorney, Agent, or Firm—Trask, Britt & Rossa

[57] ABSTRACT

A fishing lure has a battery-powered oscillator circuit positioned within a water-resistant container module that is removably inserted into a selected body module that is balanced to insure proper lure action even as fish-attracting sounds and motions are generated from the container module.

57 Claims, 9 Drawing Sheets

FISHING LURE

RELATED APPLICATIONS

This application is a continuation in part of Ser. No. 07/837,662 filed 14 Feb. 1992, now U.S. Pat. No. 5,237,771, which is a continuation of Ser. No. 07/715,730, filed Jun. 17, 1991 (now abandoned); which is a continuation of Ser. No. 07/587,251, filed Sep. 24, 1990 (now abandoned); which is a continuation of Ser. No. 07/354,917, filed May 22, 1989, now issued as U.S. Pat. No. 4,960,437.

BACKGROUND OF THE INVENTION

Field: This invention relates to fishing lures. In particular, this invention pertains to fishing lures which include means for generating fish-luring action.

State of the Art: A wide variety of fishing lures include means to generate fish-luring action in the form of noise or vibration. For example, U.S. Pat. No. 4,223,467 (Hodges, Jr. et al.) discloses a fishing lure which intermittently buzzes and vibrates upon a change in attitude. The fish lure has an ovate body with hooks suspended therefrom. Such a lure may be referred to as a plug.

U.S. Pat. No. 4,380,132 (Atkinson) discloses a plug with a water tight cavity within which a spring is positioned to oscillate, thereby to generate mechanical sounds. Alternatively, a transducer within the cavity transmits sound energy into the water.

U.S. Pat. No. 3,841,012 (Maled) shows an electrically powered cylindrical or ovate plug with a rotating eccentric to generate a wobbling type motion. Similarly U.S. Pat. No. 3,310,902 discloses an ovate or cylindrical fishing lure or plug with electrical components therein to generate a buzzing sound.

U.S. Pat. No. 4,805,339 (Fuentes et al.) shows a cylindrical or ovate plug with an electronically powered transducer fluid coupled to the water to transmit acoustic signals into the water in selected patterns.

U.S. Pat. No. 4,583,313 (Dugan, Jr.) also shows a cylindrical or ovate type fishing lure with circuitry to generate signals in a predetermined frequency band.

Lures of the type under discussion characteristically contain electrical or mechanical components within hollow bodies to which the fish are attracted. Hooks or equivalent hooking structures are attached to the bodies of such lures.

It is presently understood that typical game fish have a type of inner ear which can hear or sense sound transmitted through the water. It is further understood that fish have lateral line sensing organs which also sense sound. Such lateral line perception is apparently effective for lower frequencies, somewhere between about 4 hertz and 200 hertz. Inner ear sound sensing by fish is believed to be effective for frequencies in the range of approximately between 2 hertz and 1000 hertz.

It is believed that lateral line sensing is relied upon by fish to establish the relative origin of the sound by direction and depth and possibly even range. Specific sounds may be representative of a minnow and/or other aquatic creature which could be viewed by the fish as food. *The In-Fisherman*, Book #85, April 1989, page 42–53.

The presently available fishing lures specifically intended to radiate acoustic energy into the environment of a fish are typically configured as "plug" type lures. Lures of this type are of substantial size. None of these devices have been sized or configured as ancillary devices. An ancillary device could be attached to a jig; or it could be suspended from or attached to a plug lure. Similarly, available devices are unsuitable for combination or securement in front of or immediately proximate to a desired plug, a spinner assembly or other bait.

It is generally understood that some fish see, and in turn respond to, flashing light or movement. Whole classes of lures, such as spoons, spinners and the like, which presumably attract fish by flashing, are available. It is assumed that the flashing of such lures imitates the flash from a minnow or other aquatic creature. However, movement of the water in a manner which emulates a minnow is not well effected by existing lures, except to the extent it may be effected by movement of the lure through the water. While either trolling or retrieving a lure following a cast moves a lure past potential locations of fish, such movement does not accurately simulate the movement of aquatic life in a "home" location.

There remains a need for a small operational device which can be associated with a game fish fishing lure, bait, spinner or jig structure to impart vibrational or mechanical action. Ideally, such a device should be constructed to be readily added or subtracted to an overall fishing arrangement. It should also be configured to be either stationary or moveable, at the option of the fisherman. Further, there is a need for such devices which radiate acoustic signals preselected in a pattern to be suggestive of food to fish as well as to provide signals for lateral line sensing by the fish.

The cost of jigs, plugs and other fishing lures equipped with acoustical signal generators is necessarily higher than the cost of lures not so equipped. It would thus be highly desirable for a fisherman to have available in his tackle box a number of lure bodies of different shapes, color or color combinations that can receive and carry an insertable modular acoustical signal generator assembly. Thus, at minimum cost to the fisherman, he could have available an assortment of lure bodies and a single modular acoustical signal generator that could be inserted into a lure body selected for use. The generator device could then be removed from that selected lure body to be installed in another such lure body.

Further, there remains a need for an acoustical signal generator device capable of varying the sounds and sound patterns created. Such variations would constitute means for effectively attracting different species of fish.

SUMMARY OF THE INVENTION

A typical fishing lure of this invention includes hooking structure, notably conventional treble hooks mounted at the end of a shaft. The fishing lure further includes operation means secured to the hooking structure shaft by connecting means. The operation means generally includes a water-resistant container which contains an oscillator circuit. The oscillator circuit generates a preselected pattern of electrical signals. Battery means may be positioned within the water-resistant container to supply electrical power to the oscillator circuit. Luring means is mechanically associated with the water-resistant container and is connected to the oscillator circuit to receive the patterned electrical signals. The luring means then generates fish-luring action in accordance with the signal pattern.

In one arrangement, the hooking structure is a jig hook for freshwater fish. The connecting means is an eye formed at the end of the shaft opposite a hook portion of the hooking structure.

In another embodiment of the invention, the fishing lure may include a lure body having a cavity to receive an insertable and removable water-resistant container or container module carrying the components of an acoustical signal-generating system.

In a preferred arrangement, a battery means comprising at least one wristwatch-type battery is relied upon to drive an oscillator circuit. The water-resistant container preferably has a first aperture to receive at least one such wristwatch-type battery. Closure means is provided to seal the aperture after insertion of the battery.

In a particularly desirable arrangement, the hook portion of a hooking structure is characterized by a diameter, and the water-resistant container is a cylinder having a diameter less than the diameter of the hook portion. The cylinder may also have a length less than the length of the shaft portion of the hooking structure. Preferably, the hook portion of the hooking structure is an arcuate extension of the shaft portion. Typical hooks have a diameter within the range of about 1" to about ¼". The shaft is preferably from about 1" to about 2" in length. The water-resistant cylinder may have a first end with an aperture formed therein. The closure means may be a plug insertable into the aperture.

In a typical arrangement, the luring means includes a coil in combination with a movable plunger. The plunger is positioned to contact the water-resistant container proximate the coil. The coil is connected to receive the preselected patterned electrical signals. The plunger moves toward and away from the coil and against the water-resistant container in response to the signals, thereby to make fish-attracting sounds. Preferably, the patterned electric signals are selected to cause operation of the plunger at a preselected frequency. Ideally, sounds are produced in pulses at a preselected pulse repetition rate.

Desirably, means is provided to vary the frequency and/or the pulse repetition rate so that the luring means can be used to attract more than one species of fish. It is within contemplation that the luring means be tuneable to most effectively attract the particular species of fish being sought.

In an alternate arrangement, the fishing lure of the instant invention may further include a coil with a movable plunger sized to contact the wall of a water-resistant container. A spring is interconnected between the plunger and the container wall to urge the plunger toward the wall. The coil is connected to receive preselected patterned electrical signals to move the plunger away from the water-resistant container and to thereafter release the plunger for movement by the spring against the container wall. Preferably the patterned electrical signals cause the coil to activate the plunger at a preselected frequency and most preferably in pulses at a preselected pulse repetition rate.

In one configuration, the water-resistant container includes a second aperture. An extension may then be attached to the plunger to sealably and movably extend through the aperture. Reciprocal movement of the plunger imparts fish-attracting motion to the water.

The preselected patterned electrical signals typically include a base signal at a preselected frequency transmitted in pulses at a preselected pulse repetition rate. Motion is thereby imparted to the lure at the same multiple of the frequency or the pulse repetition rate. Variable resistors may be incorporated to provide for changing of the frequency and/or the pulse repetition rate. The frequency of the sound produced may further be varied by adjusting the air volume of an associated resonance chamber.

Desirably the fishing lure includes a rubber-like boot positioned over the second end of the container and connected to the extension for movement thereby. In an alternate arrangement, a paddle extends from the extension through the second aperture, for movement by the extension. A rubber-like boot may be sealably positioned about the paddle and the second aperture.

An alternate fishing lure includes an operation device secured to the lure. The operation device includes a water-resistant container with an oscillator circuit, battery means and luring means to generate fish-luring action.

BRIEF DESCRIPTION OF THE DRAWINGS

In the drawings, which illustrate the best mode presently contemplated for carrying out the invention.

DESCRIPTION OF THE ILLUSTRATED EMBODIMENTS

Figure 1:
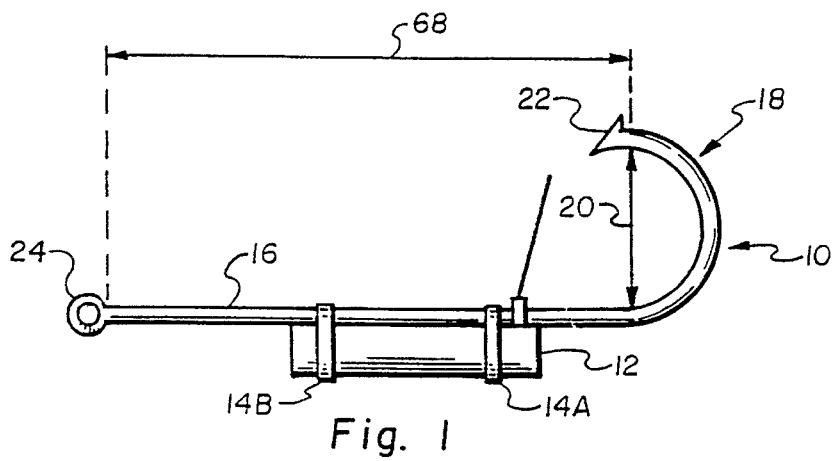
FIG. 1 is a side view of a fishing lure of the instant invention.

A fishing lure of the instant invention includes hooking structure for fishing in water with operation means secured thereto by securing means. As shown in FIG. 1, the hooking structure is a hook 10 of the type which may be used for fishing for game fish such as bass, walleye, and the like. Other sizes and shapes of hooks may be equally suitable. The operation means shown in FIG. 1 is an operation device 12 secured to the hooking structure by connecting means constituting straps 14A and 14B. The operation means generates fish-luring action.

The fishing lure arrangement of the invention may also include a plug or a combination of plugs with spinners. It may also be embodied with operation means placed in front of a hook with bait such as a worm or minnow. Indeed, the fishing lure may be virtually any structure secured to the end of a fishing line, the purpose or objective of which is to act as a bait or a lure for fish.

The hooking structure 10 shown in FIG. 1 includes a shaft 16 extending away from hook 18. In FIG. 1, the hook 18 is illustrated as an arcuate extension of the shaft 16 having a diameter 20 with a barb 22 at its end. At the end of the shaft 16 remote from the hook 18 is connection means shown as an eye 24 formed for connection to the fishing line, a leader or similar structure.

The operation means is secured to the shaft 16 of the hooking structure 10 by connecting means which is here shown to be two straps 14A and 14B which are snugly wrapped about the operation device 12 and the shaft 16. Other means of securing the operation device 12 to the shaft or hooking structure 10 may be equally as suitable. For example, rubber bands or elastics, gluing, heat shrinkable tubing and clamping may also be suitable.

Figure 3:
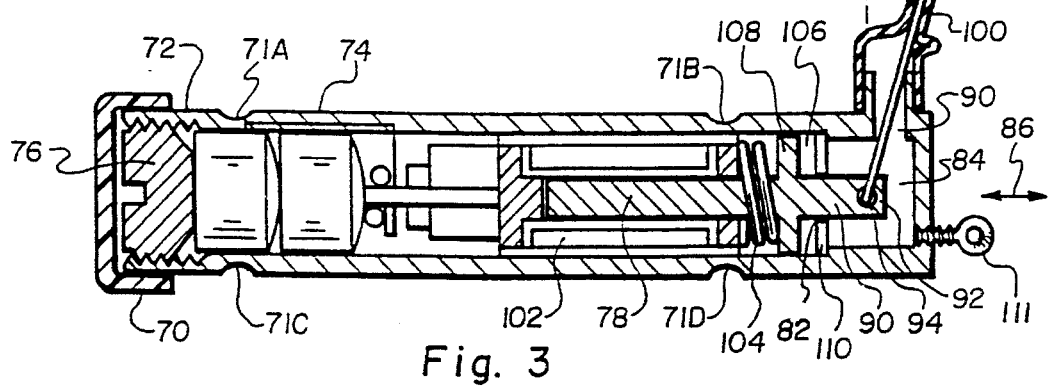
FIG. 3 is a cross-sectional view of an alternate embodiment of an operation device of the instant invention.

As better seen in FIG. 3, the operation device 12 has recesses 71A–D formed in its external surface to accommodate the straps or strings 14A and 14B. The straps 14A and 14B may be any convenient material desired by the user. As presently contemplated, the straps 14A and 14B will be some form of nylon or plastic material which is not water absorbent. Notably, the lure of FIG. 1 may be used as a jig.

Figure 2:
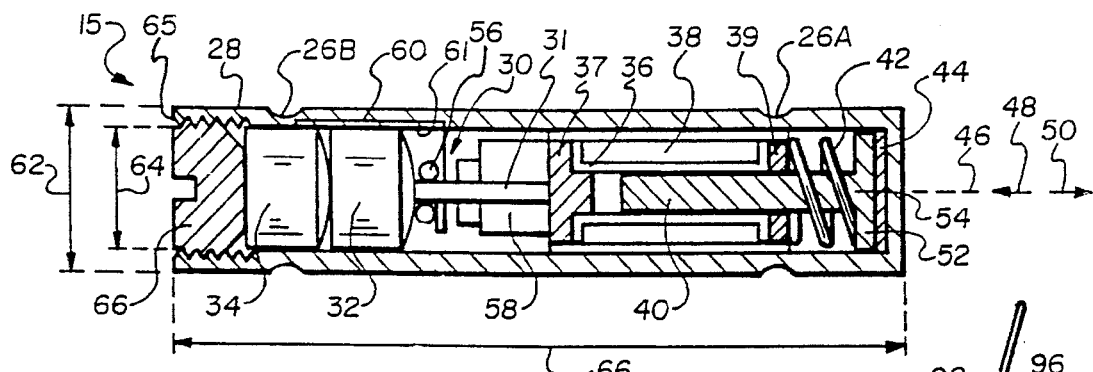
FIG. 2 is a cross-sectional view of an operation device of the instant invention.

FIG. 2 is a cross-sectional view of an operation device 15 substantially enlarged for purposes of illustration and discussion. The operation device 15 includes a water-resistant container 28 housing an oscillator circuit 30. The oscillator circuit may be any one of the types illustrated schematically in FIGS. 5, 6 and 7 or their respective equivalents or substitutes. The oscillator circuit 30 is positioned within the water-resistant container 28 and includes a circuit board 31 with components 56 and 58 interconnected to generate and supply preselected patterned electrical signals.

Battery means is also positioned within the water-resistant container 28 and conductively connected to supply electrical power to the oscillator circuit 30. As illustrated in FIG. 2, the battery means is comprised of two wristwatch-type batteries 32 and 34. The luring means of the operation device 15 is mechanically associated with the water-resistant container 28 and is connected to the oscillator circuit 30 to receive the preselected patterned electrical signals to in turn generate fish-luring action in accordance with the patterned electrical signals.

In FIG. 2, the battery means is shown contacting circuit board 31 to supply power to the oscillator circuit 30 and in turn to the luring means. The illustrated luring means incorporates a solenoid which includes a coil 38 and a coil core or plunger 40 positioned for movement by and within the coil 38. The coil 38 is positioned in a plastic spool 36. The efficiency of the coil 38 is enhanced by end plates 37 and 39. The coil 38 is a conventional coil consisting of windings which generate a magnetic flux upon activation with electrical energy. The plunger 40 is made of a material susceptible of movement by the magnetic flux generated by the coil 38.

As shown by FIG. 2, a spring 42 is positioned between the plunger 40 and the coil 38 to urge the plunger 40 toward 50 the strike plate 44 in the water-resistant housing 28 along the center axis 46 of the coil 38. The strike plate 44 may be fashioned from any material which generates a desired sound or vibration when struck by plunger 40. In the illustrated embodiment, the strike plate is metal.

In operation, the coil 38 creates a magnetic field which draws the plunger 40 axially away 48 from the strike plate 44. Upon deactivation of the coil 38 by the oscillator circuit 30, the plunger 40 is urged along axis 46 toward 50 strike plate 44. Mechanical contact between the plunger 40 and strike plate 44 creates a mechanical noise with an energy or decibel level related to the speed at which the plunger 40 strikes the plate 44.

As shown by FIG. 2, a clapper 52 is positioned at the distal end 54 of the plunger 40. The clapper 52 is sized to slidably fit within the water-resistant container 28. Thus, the clapper 52 acts not only as a member to contact the strike plate 44 to create the noise as discussed hereinbefore, but also as an alignment bushing which maintains the alignment of the plunger 40 as it moves axially 46 inwardly 48 and outwardly 50.

The spring means 42 as here illustrated is a coil spring with a spring constant or resiliency selected so that the coil 38 may cause the plunger 40 to move inwardly 48 and overcome the outward 50 force of the spring 42. Other types of springs, including leaf springs, and even a foam rubber material selected with a resiliency upon compression which would urge the plunger 40 outwardly 50 toward the strike plate 44 of the water-resistant container 28, are also useful.

The coil 38 is here shown in cross-section without depicting the windings thereof to avoid confusion. The coil 38 may be selected from commercially available coils. In a successful prototype, the coil arrangement was included within a standard vibrator part no. 12RT04CC. The oscillator circuit 30 may be any one of the oscillator circuits schematically illustrated in FIGS. 5, 6 or 7. The circuit is connected to the batteries 32 and 34 by a positive conductor 60 illustrated within the wall 61 of the water-resistant container 28.

However, it should be understood that the water-resistant container 28 may itself be metallic and act as a conductor.

As illustrated, the operation means includes batteries 32 and 34. In particular, cylindrical silver oxide batteries are now widely available and suitable for use in small objects such as in watches, hearing aids, pocket calculators and the like. Mercuric oxide and silver oxide batteries are useful because they are available with appropriately large current density of about 100 milliamperehours. The silver oxide batteries are presently preferred because they have better shelf life and because they present less of an environmental liability. The small batteries preferred for use are conveniently herein termed wristwatch-type batteries. Presently, two such batteries are used to provide increased power and extended life. The diameter 62 of the water-resistant container 28 is selected to accommodate the wristwatch-type batteries 32 and 34. That is, the inside diameter 64 is selected so that the batteries 32 and 34 may be slidable and snugly positioned within the water-resistant container 28. After positioning of the batteries 32 and 34 through the aperture 65 as illustrated in FIG. 2, a plug 66 is here shown threaded into the aperture 65 of the water-resistant container 28 to snugly urge the batteries 32 and 34 into conductive connection to circuit board 36. Virtually any form of sealing arrangement can be used to seal the aperture 65 as long as it urges the batteries and retains them within the water-resistant structure and effects a water-resistant field. The plug 66 illustrated is slightly oversized so that upon threaded placement within the water-resistant container 28, a water-resistant seal is effected. Other structures, such as that shown in FIG. 4, as well as a rubber boot or even a cork arrangement with conical interior surface in the aperture 65, could be used for this purpose. A conical interior sealing surface offers the advantage that increasing water pressure tends to enhance the seal.

The water-resistant container 28 may be made of any desired material. As illustrated, it is preferably a plastic material which is not susceptible to corrosion while being impervious to water. The water-resistant container 28 is shown to be cylindrical in shape with two blunt ends. It should be appreciated that the container 28 and its ends may be formed in a variety of shapes for image or appearance and for hydrodynamic reasons.

The diameter 62 of the operation means (FIG. 2) is selected to be less than the diameter of the hook 18 (FIG. 1). Similarly, the length 66 of the operation means in FIG. 2 is selected to be less than the length 68 of the shaft 16. In particular, it can be seen that the operation means in FIG. 1 is miniaturized to easily adapt to a hooking structure 10 selected to catch game fish such as bass, crappie, walleye, trout and the like. Thus the diameter 20 of the hook 18 will ordinarily be selected from within the range of about 1" to about ¼" with the length 68 of the shaft 16 being selected from within the range of about 2" to about 1". The combination of the operation means 12 with the hooking structure 10 in FIG. 1 forms what may be viewed as a jig lure.

In other fishing configurations, the operation device 12 shown in FIG. 1 may be attached by screw eyes or by straps to a plug. Alternatively, it may be suspended or interconnected in the fishing line in front of a bait or behind a bait, depending upon the particular fishing arrangement selected. FIG. 3 shows a screw eye 11 suitable for attaching to other structures.

Referring now to FIG. 3, the operation means illustrated in cross-section is substantially similar to the operation means of FIG. 2. FIG. 3 shows a rubber like boot 70 placed over one end 72 of the water-resistant container 74. The rubber boot 70 may be used with a spring or clip to hold the batteries in place, either in lieu of the plug 76 or in combination with the plug 76 to improve the sealing and water-resistant character of the operation means.

FIG. 3 shows the plunger 78 with an extension 90 passing through an aperture 82 formed to snugly and slidably receive the plunger 78. The plunger 78 extends into a chamber 84 and moves back and forth or reciprocates 86 therein upon movement of the plunger 78. An arm 88 extends outwardly through an opening 90. The arm 88 is connected to the distal end 92 of the plunger 80. As here shown, the arm 88 is connected by simply inserting it through an opening 94 formed in the distal end 80 of the extension 90. The opening 94 is sized to allow the arm 88 to move 96 through an arc 98. A rubber boot 100 is positioned around the opening 90 and the arm 88 to effect a water-resistant seal.

In FIG. 3, the plunger 78 is shown withdrawn by solenoid 102 with the spring 104 compressed to create a gap 106 through which the clapper 108 moves to contact the strike plate 110 in order to create a noise simultaneously with the movement of the arm 88 to effect water agitation as fish-luring action. Of course, the strike plate 110 may be a sound absorbent material so that the water agitation is effected without noise. Also, an eye similar to eye 111 may be attached to one or both ends to facilitate attachment to a fishing line near a bait or to other lure structure.

Figure 4:
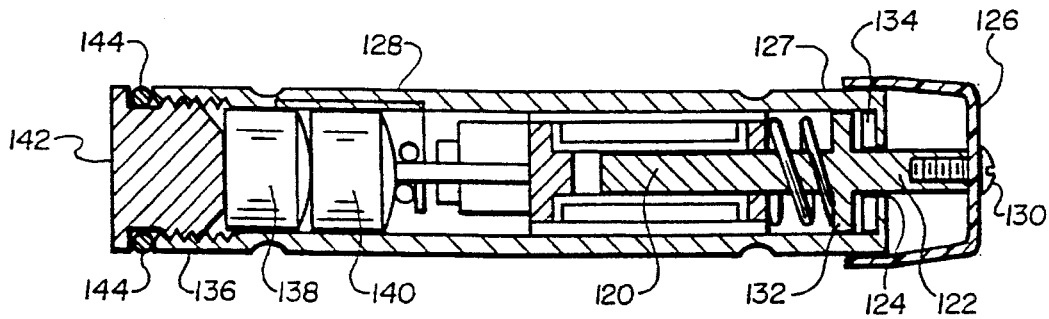
FIG. 4 is a cross-sectional view of an alternate embodiment of operational structure of the instant invention.

The operation means shown in cross-section by FIG. 4 is substantially identical to that shown in FIG. 2. FIG. 4 shows the plunger 120 with an extension 122 extending through an aperture 124. The aperture and the extension 122 are sized so that the extension may snugly yet slidably move through the aperture 124. A rubber boot 126 is sealingly positioned about the end 127 of the water-resistant container 128 to effect a water-resistant seal. The boot 126 may be secured to the extension 122 by a screw 130. Upon movement of the plunger 120, and in turn the extension 122, the boot 126 flexes in and out to create water turbulence in the vicinity of the boot 126 as fish-luring action. At the same time, the clapper 132 contacts the strike plate 134 to generate a noise. The clapper 132 may be eliminated, or it may be smaller than the inside dimension of the container 128. Alignment of the plunger 122 can be maintained by the aperture 124, which aperture also simultaneously acts as a bushing. At the other end 136, the batteries 138 and 140 are held in place by a plug-cap 142 with a gasket 144 to effect a water-resistant seal.

Figure 5:
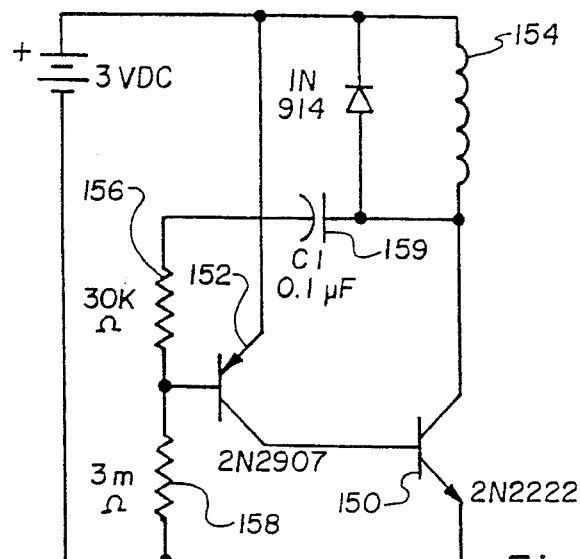
FIG. 5 is a circuit diagram of an oscillator circuit for use in an operational structure of the instant invention.

Referring to FIG. 5, an oscillator circuit is shown using a complementary pair of bipolar transistors 150 and 152. The coil 154 is energized to produce movement of the plunger 40 at a frequency determined by the combination of the resistors 156, 158 and capacitor 159. The ratio of the values of the resistors 156 and 158 determines the length of time that the coil 154 is energized and in turn the amount of power consumed in operation. The two resistors 156 and 158 may be valued at 30 kilohms and 3 megohms, for example. This relationship results in an output signal supplied to the coil 154 of a frequency of about 4 hertz. By adjusting the ratio of the resistors 156 and 158, the frequency can be selected to vary from about 4 hertz to about 1000 hertz.

Figure 6:
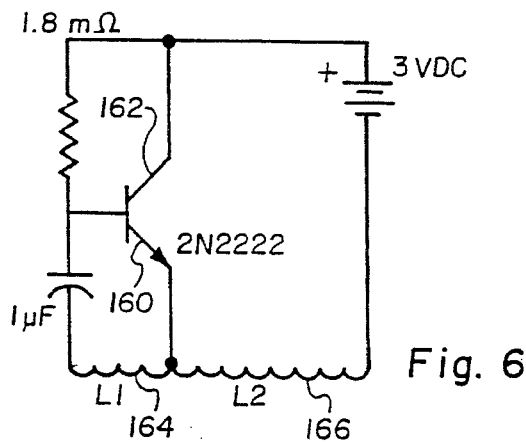
FIG. 6 is a circuit diagram of an alternate oscillator for use in the operational structure.

FIG. 6 depicts an alternate oscillator circuit which is a simplified Hartly oscillator. The coil 38 is composed of two inductors 164 and 166 which actually form part of the overall oscillating circuitry. The emitter 160 of the transistor 162 is connected to the coil structure so that the coil 164 has about one-half the number of winding turns as does the coil 166.

Figure 7:
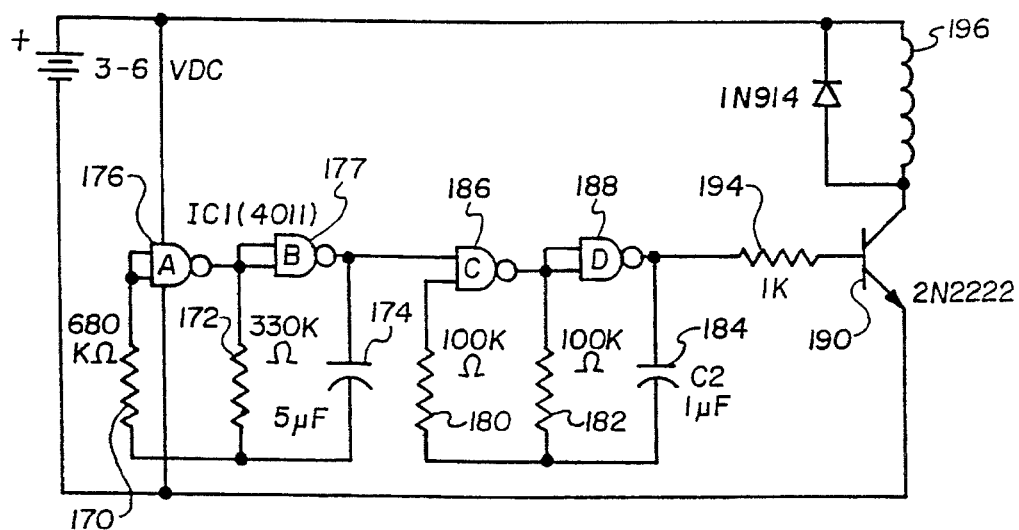
FIG. 7 is a circuit diagram of an alternate oscillator circuit for use in the operational structure of the instant invention.

A two-stage oscillator circuit is shown in FIG. 7. The first oscillator is composed of resistor 170, resistor 172, capacitor 174 and two dual input "nand" gates 176 and 177. The nand gate is one-quarter of a standard quad nand gate integrated circuit. Complementary metal oxide semiconductor (CMOS) circuitry is preferred due to low power consumption and wide supply voltage range. The first oscillator is connected to select the pulse repetition rate of the device; it controls the frequency and length of time that the second oscillator is enabled to produce higher frequency pulses. The second oscillator as here shown includes resistors 180, 182 and capacitor 184 along with input nand gates 186 and 188. The second oscillator generates a pulse train drive through a bias resistor 194 to drive the coil 196 of the solenoid.

Any one of the circuits shown by FIGS. 5, 6 or 7 may be formed on a miniaturized IC printed circuit board such as circuit 36 of FIG. 2. The oscillator circuit can be constructed to provide signals at a selected frequency in pulses at a preselected pulse repetition rate. The pulse repetition rate is preferably selected to be between 4 hertz and 200 hertz to be sensed by the lateral sensing of the fish. The frequency of the signals generated by the action of the clapper 52 striking plate 44 is selected to be detectable by the inner ear sensing of a fish.

The operation means may be constructed to be buoyant so that the entire structure operates at shallow depths and even on water surface.

The arm 88 or the boot 126 may be operated to generate motion within the water into which the operation means is placed. High speed motion may be effected to generate water noise roughly at the same frequencies and at the same pulse repetition rates. Also rapid operation in the water medium creates a kind of frothing or cavitation which may also visually be detected by a fish.

Figure 8:
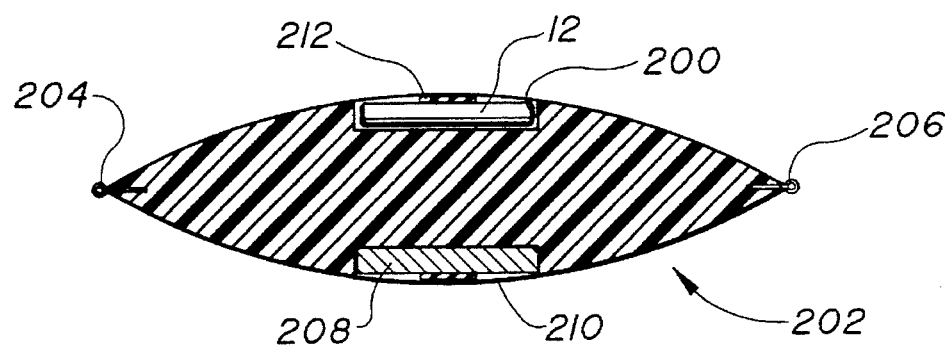
FIG. 8 is a cross-sectional view of another embodiment of a fishing lure of the instant invention, showing an operation device mounted therein.

In the embodiment of the instant invention shown in FIG. 8, an operation device 12, as previously described, is removably mounted in a cavity 200 of a lure body 202, here shown as a plug, with an eye 204 on one end to receive a fishing line or a swivel or other attachment means for a fishing line. An eye 206 at an opposite end of the body may carry a fish hook, extension of the fishing line or other structure.

A counterweight 208 is embedded in the lure body 202. The positioning and value of the weight are selected to offset the weight and positioning of the operation device 12 and to maintain the center of gravity of the lure the same as it would be if the lure body were made solid and did not include the operation device and counterweight.

A groove 210 is formed around the lure body at the midpoint of the cavity 200 and an elastic band 212 encircles the lure body, fits tightly in the groove 210 and engages the operation device 12 to securely hold the operation device in place. The operation device can be quickly and easily removed by first removing the elastic band.

In operation, as the lure body is moved through the water while being used for fishing, for example, while being trolled or retrieved after casting, the operation device module generates fish-luring action.

The lure body 202 may be configured as a plug, jig, spoon, wobbler, trolling apparatus (e.g. "pop gear"), or any other useful form. Whatever the configuration of the fishing structure used, however, interchangeable lure bodies 202 can be in any desired number for use with a single operation device. Such a device may be provided as a module available for use with any desired number of lure bodies.

Figure 9:
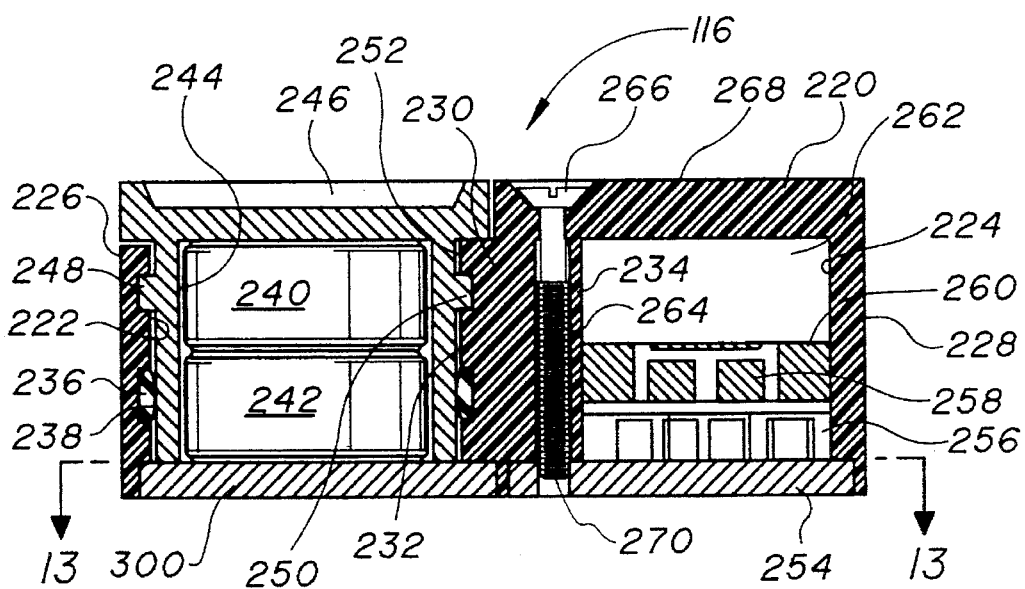
FIG. 9 is a longitudinal cross-sectional view through another embodiment of an operation device of the present invention.
Figure 10:
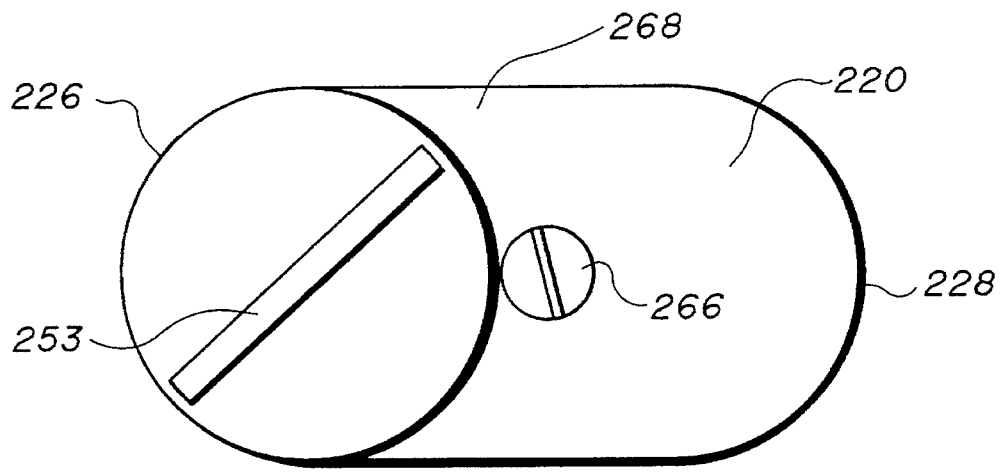
FIG. 10 is a top plan view of the operation device of FIG. 9.

Another embodiment of an operation device module is shown best in FIGS. 9 and 10. As shown, the module 116 includes a case 220, which may be of molded plastic, or the like, and that has a battery compartment 222 and a circuitry compartment 224. The outside ends 226 and 228 of the case are preferably rounded and a central wall 230 has arcuately curved faces 232 and 234, respectively, forming inner walls of the compartments 222 and 224.

The face 232 cooperates with the inner face of curved end wall 226 such that the battery compartment is of circular cross-section. A groove 236 extends around the inside of compartment 222 to receive an O-ring 238 that provides a seal between the walls of the battery compartment and a battery cap to prevent water entry into the battery compartment. A pair of watch batteries 240 and 242 are stacked and snugly fitted into the interior cavity 244 of a battery cap 246. The battery cap 246, as shown, has a pair of oppositely projecting lugs 248 and 250 that turn in a thread 252 formed on the wall of cavity 222 to lock the battery cap into the case 220. The top exterior wall of the battery cap includes a screwdriver slot 253.

The circuitry compartment 224 includes a printed circuit board 254 which additionally serves as a bottom closure wall for the compartment 224. An oscillatory circuit 256, and a coil 258 inside a toroidal permanent magnet 260 are also positioned in compartment 224. In addition, a space 262 within the circuitry compartment serves as a resonance chamber for the present operation device module 116.

A bolt 264 is positioned with its slotted head 266 recessed in the top wall 268 of the case 220. It extends through the central wall 230 to be secured in place and has a threaded end 270 projecting from beneath the case 220.

Figure 11:
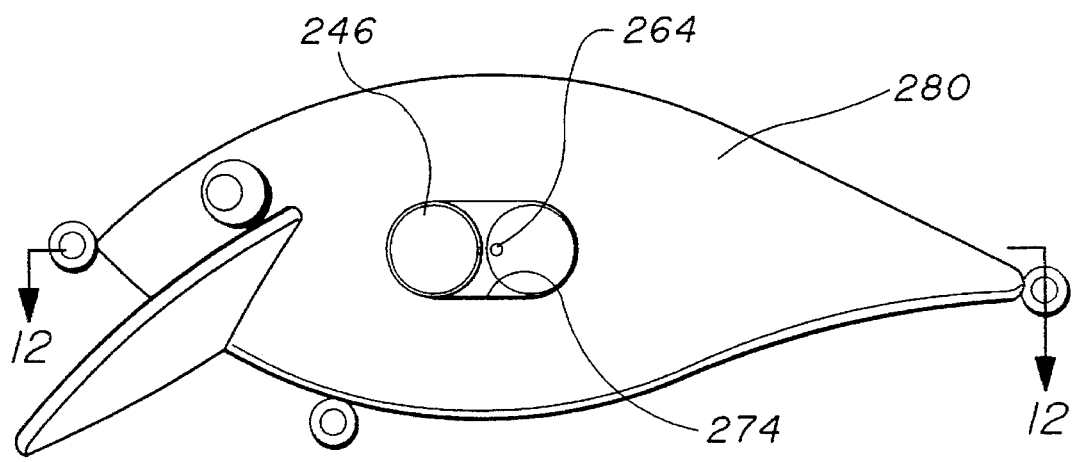
FIG. 11 is a side elevation view of still another fishing lure of the instant invention, with the operation device of FIG. 9 locked therein.
Figure 12:
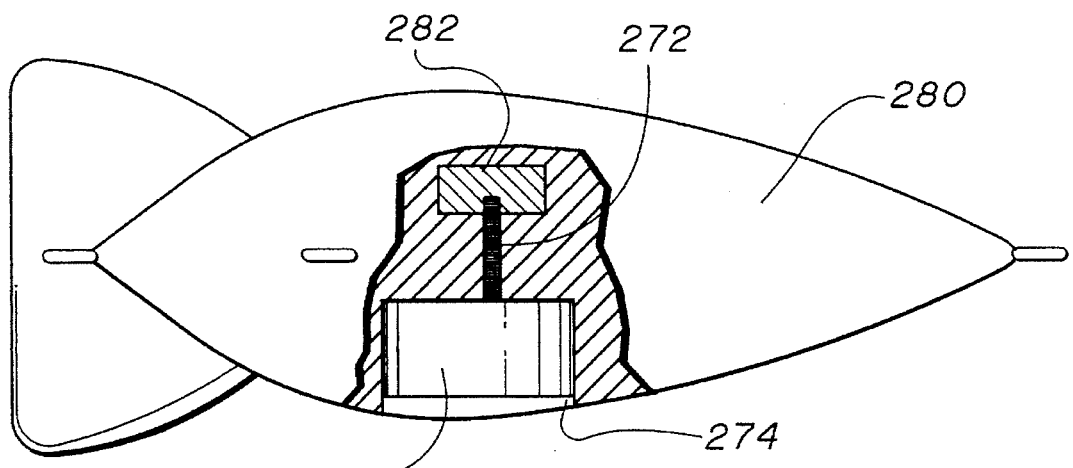
FIG. 12 is a cross-sectional view taken on the line 12—12 of FIG. 11.
Figure 13:
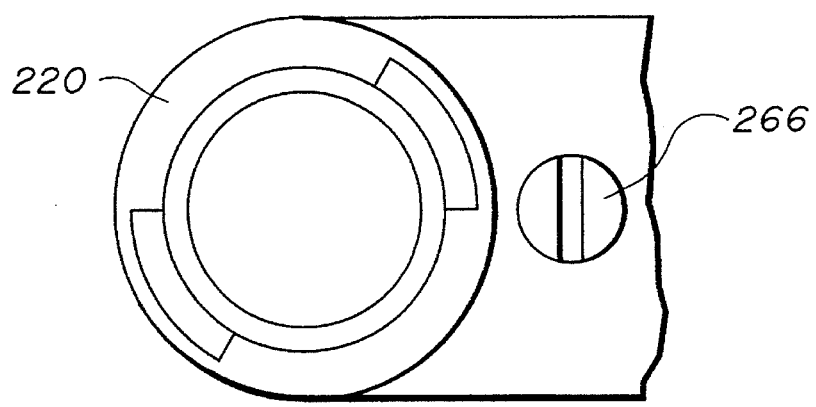
FIG. 13 is a fragmentary top plan view of a battery case of the invention with the battery cap removed.

The end 270 of bolt 264 is adapted to be screwed into a threaded hole 272 (FIG. 12) that extends from a cavity 274 in a lure body, such as the lure body shown at 280 in FIGS. 11 and 12, so as to lock the module 116 into the lure body. The hole 272 may extend into a counterweight 282 that is positioned and weighted to counterbalance the weight and positioning of module 116, while maintaining a constant center of gravity for the lure.

Figure 14:
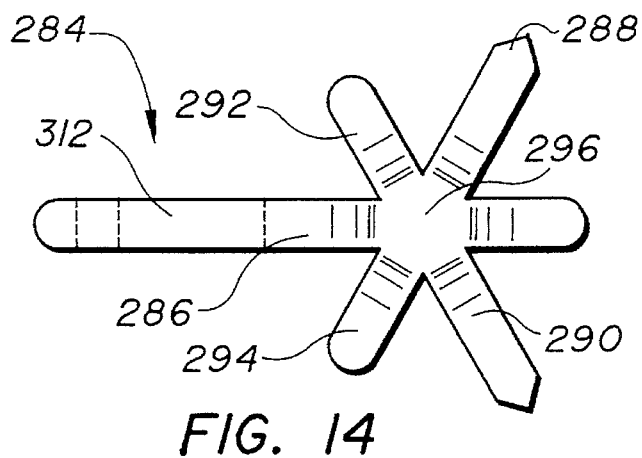
FIG. 14 is a top plan view of a battery cap switch spring.
Figure 15:
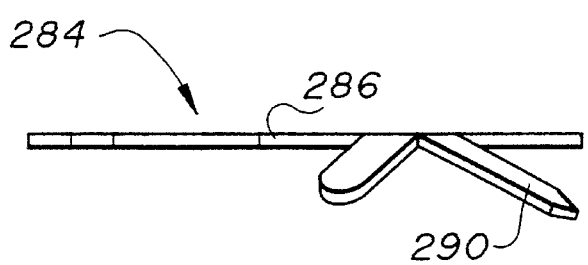
FIG. 15 is a side elevation view of the switch spring of FIG. 14.

FIGS. 14 and 15 show a switch spring 284 that is adapted to be inserted into the battery cap and that will, when the cap is fully inserted and locked into position, establish electrical contact between the batteries and the electronic circuitry within the circuitry compartment 224.

The switch spring 284 is of spring steel, or the like, and includes a flat anchor member 286 that fits snugly within the cavity of the battery cap to be frictionally held in place. A pair of long fingers 288 and 290 radiate from a common junction 296 on the flat anchor member to make the necessary electrical connections when the battery cap is fully locked into the case to provide power to the circuitry. A pair of short fingers 292 and 294 assist the flat anchor member in holding the switch spring in the battery cap.

The circuit board 254 is formed separately from the case 220 and carries a printed circuit 256 that extends into the circuitry compartment.

A circular foil contact 304 (FIG. 17) is provided on a bottom 300 of the battery compartment 222 to engage the center of the battery 242 and to serve as a negative battery contact. Foil contacts 306 and 308, interconnected by a wire 310, are provided at opposite sides of and spaced from the contact 304 to serve as positive battery contacts.

Figure 16:
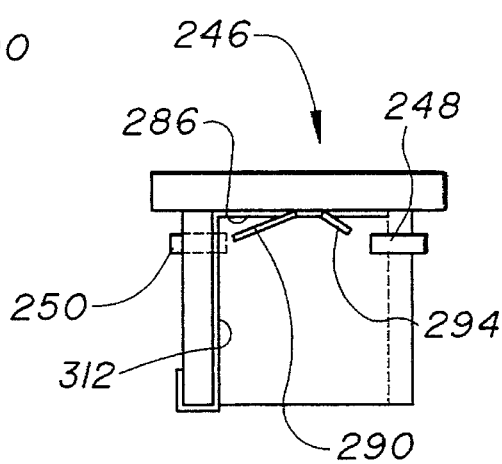
FIG. 16 is a vertical section view through a battery cap, showing the switch spring of FIG. 14 mounted therein.

An extension 312 (FIGS. 14–16) of the flat anchor member 286 extends the length of the wall to be turned over the edge of the wall of cap 246 and to engage one of the positive contacts 306 and 308 that are connected to the printed circuit 302 when the battery cap is fully locked in position.

A lead 314 connects the wire 310 between the positive contacts with the printed circuit 302 and a lead 316 connects the negative contact 304 with the printed circuit. The circuit is completed when the extension 312 engages a contact 306 or 308 and the fingers 280 and 290 engage the negative post of the battery 242 when the battery cap is locked in place.

Figure 17:
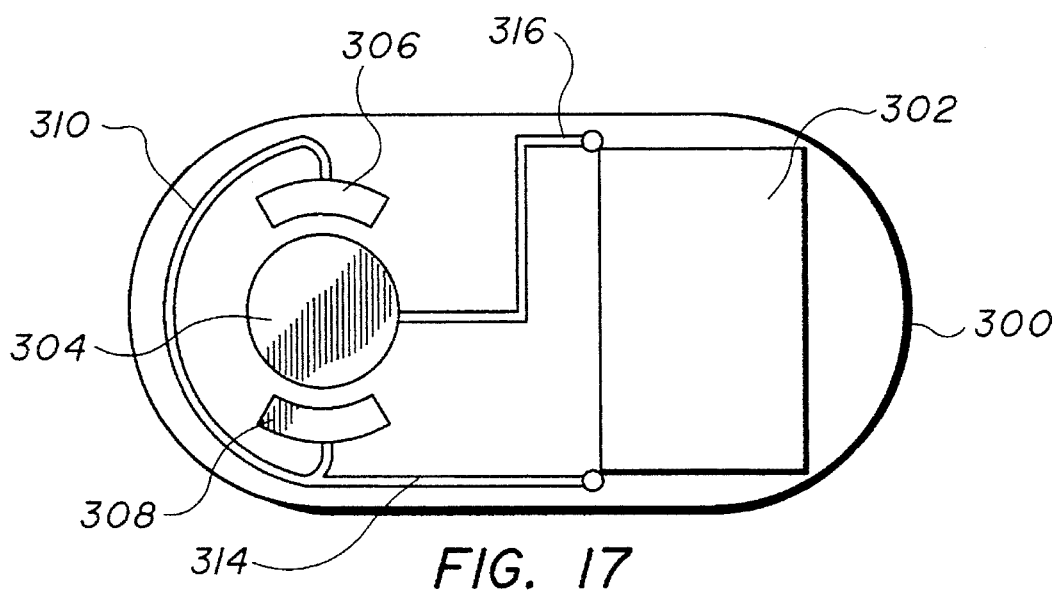
FIG. 17 is a transverse sectional view taken on the line 17—17 of FIG. 12, showing the positive and negative contacts between the batteries and the printed circuitry used.
Figure 18:
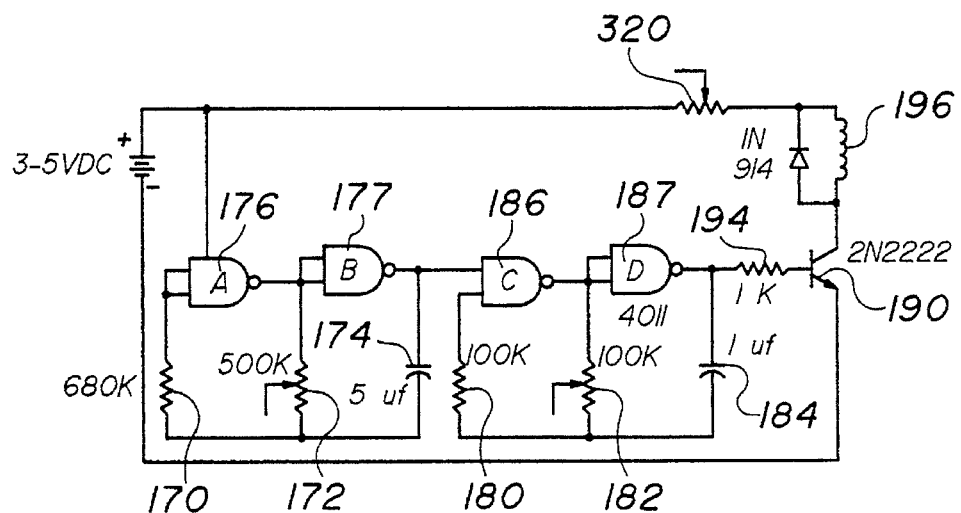
FIG. 18 is a circuit diagram including means to vary the frequency and/or the pulse repetition operated by the circuit shown.

The circuit of FIG. 18 is like that of FIG. 7, and can be formed on a miniaturized IC printed circuit board, such as the printed circuit 302 of FIG. 17. Since the circuit 302 is generally like that of FIG. 7, all components are given the same reference numerals as the circuit of FIG. 7. In this circuit, however, the resistors 172 and 182 are variable, and a third variable resistor 320 is added in series with the positive power supply and the transducer 196. While three variable resistors have been shown, it will be apparent that each functions independently in the circuit and that one, two or three of the variable resistors can be used to vary the circuit operation. If the resistor 172 is made variable, the user may, by changing the resistor, vary the rate of clicking produced by the circuit. If the resistor 182 is made variable, the user may adjust the frequency generated within the clicks when the transducer 196 is a piezoelectric or mechanical audible transducer. Adjustment of the variable resistor 320 varies the volume output of the circuit.

Figure 19:
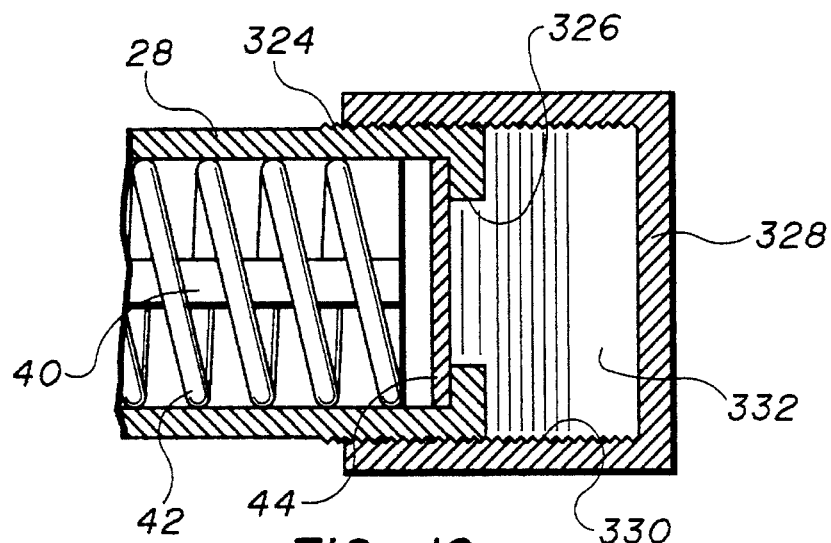
FIG. 19 is a fragmentary view of a modified operation device including means to vary the frequency of the sound generated.
Figure 20:
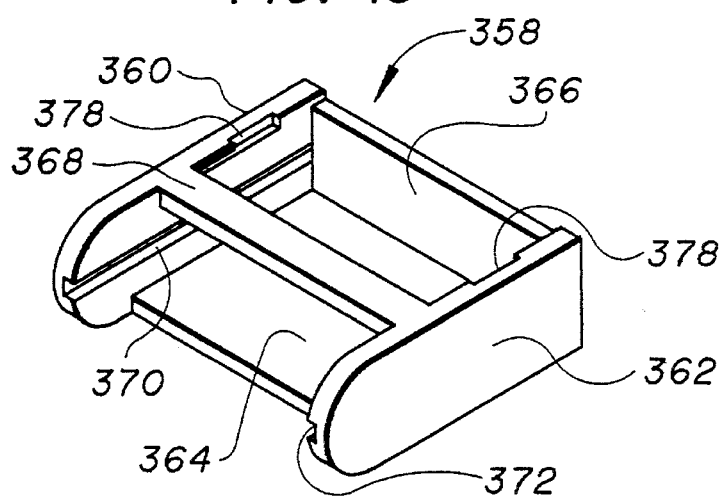
FIG. 20 is a perspective view of the casing for another embodiment of an operation device of this invention.
Figure 21:
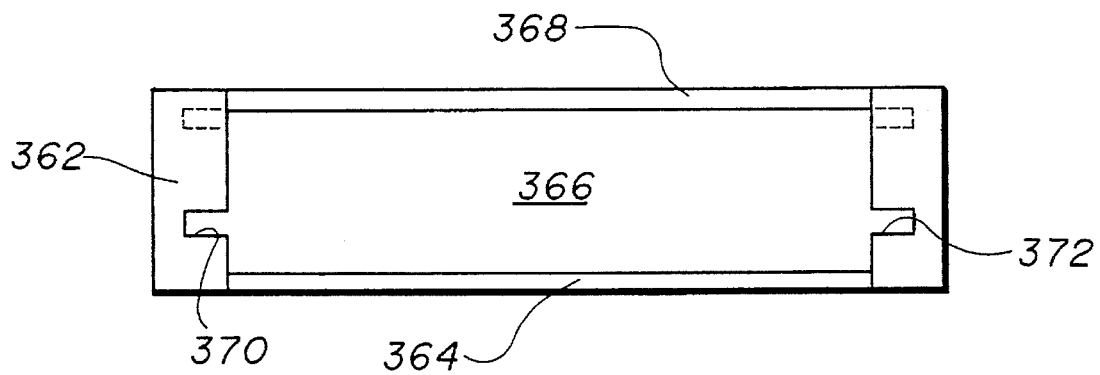
FIG. 21 is a top plan view of the casing of FIG. 20.
Figure 22:
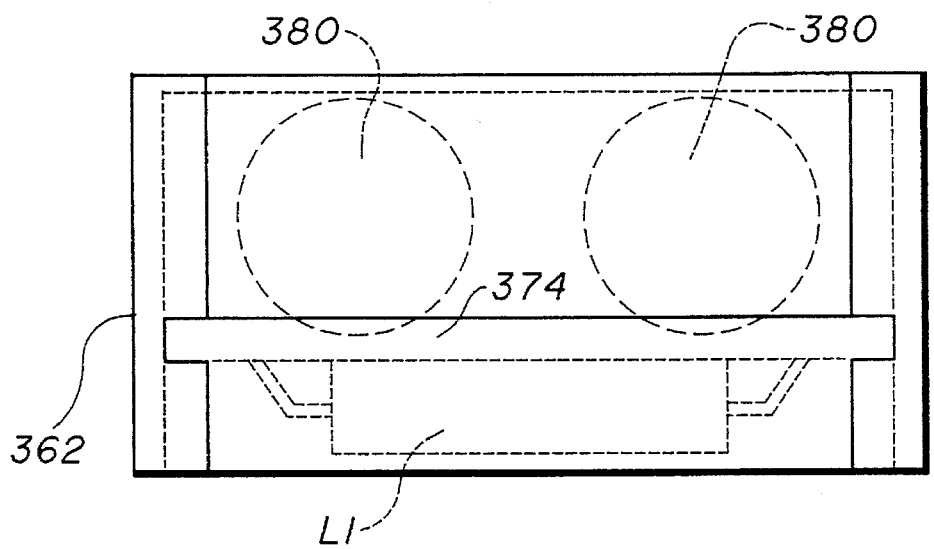
FIG. 22 is a side elevation view of the casing of FIG. 20.
Figure 23:
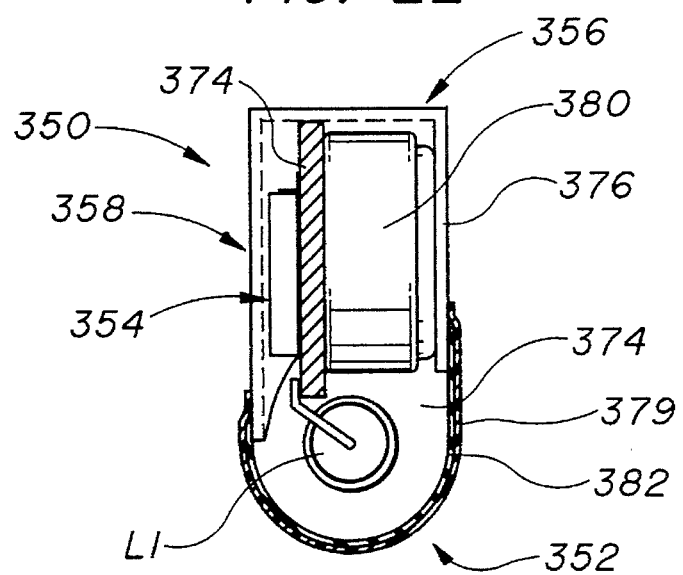
FIG. 23 is a transverse sectional view through a fully constructed operation device including the casing of FIG. 20.

FIG. 19 describes another method of adjusting the frequency within the clicks when an operation means module of the type shown in FIG. 2 is used. In this embodiment, the end of container 28 containing spring 42, plunger 40 and strike plate 44 is exteriorly threaded at 324. An opening 326 is provided through the end of container 28 against which strike plate 44 is positioned and a closure cap 328, having internal threads 330 and a space 332 formed therein, is threaded onto the container 28. The space 332 acts as a resonance chamber, the volume of which is varied by the extent to which the closure cap is threaded onto the container 28. A user may easily turn the cap 328 to move onto or off the container 28 to change the volume of space 332, as desired. The frequency of the generated sound, which is dependent upon the velocity of sound in air and the volume of space 332 is thereby altered.

FIGS. 20–23 illustrate another sound-generating module that may be incorporated into fishing lures including hard body and lead head or bottom bouncing baits.

In this embodiment, the module, shown generally at 350, consists of a piezoelectric transducer 352, an electronic excitation circuit 354, a battery power source 356 and a case 358.

The case 358 (FIG. 20) is configured to be easily inserted into and removed from any particular crank bait and to then be placed into another crank bait of a different shape or color. Case 358 includes a pair of end walls 360 and 362 interconnected by a side plate 364, an end plate 366 and a rib 368. Opposed slots 370 and 372 in the end walls 360 and 362, respectively, receive a printed circuit board 374 (FIG. 23), and a battery access panel 376 (FIG. 23) snaps into grooves 378 provided therefor in the end walls and against end plate 366 and rib 368 to provide a water-tight removable seal that allows for access to batteries 380.

A piezoelectric transducer 382 is formed from a highly polar poly-vinylidene fluoride film. Physically it is a flexible, compliant, clear plastic film commercially available from Elf Atochem Sensors, Inc., Valley Forge, Pa. (formerly Pennwalt) and sold under the trade name KYNAR. The material is commonly used as a switch material in sonar applications and as a speaker element in certain miniature stereo headphones. The material has an excellent acoustic match to water, an output frequency independent of size, lower cost than many other usable materials, and is adaptable to unusual configurations and manufacturing processes.

In the illustrated instance, the film is stretched over curved ends of end walls 360 and 362, outside of the case, to be placed into intimate contact with the water. The film is preferably bonded to the end walls' support structure, as shown, to provide an air space 374 behind piezo material or alternatively it may be bonded to a compliant polyurethane (or similar) foam (not shown) and a rigid case to allow movement of the piezoelectric transducer. The foam assists in maintaining a curved film shape, which shape produces significantly higher sound volume than can be obtained with a flat film. As a piezo film is excited, dimensional changes occur to the film's height, width and length. When the film is flat, only changes in the height dimension are significant to sound generation. When the film surface is curved, however, changes in length (the largest dimension) cause pressure changes at vectors perpendicular to the face of the film, thereby optimizing sound output. Constructing piezo films in layers, for example into a bimorph, also tends to exaggerate the sound generating motion of the film.

The transducer may be covered with a rigid, perforated grill 379 to protect the material from damage by hooks, fish biting, or striking rocks or other hard surfaces. The grill may also be bonded, as shown, or otherwise attached to the case 358. It is within contemplation that the module 350 be mounted within a bait, and the grill 379 bonded to the surface of the bait.

Figure 24:
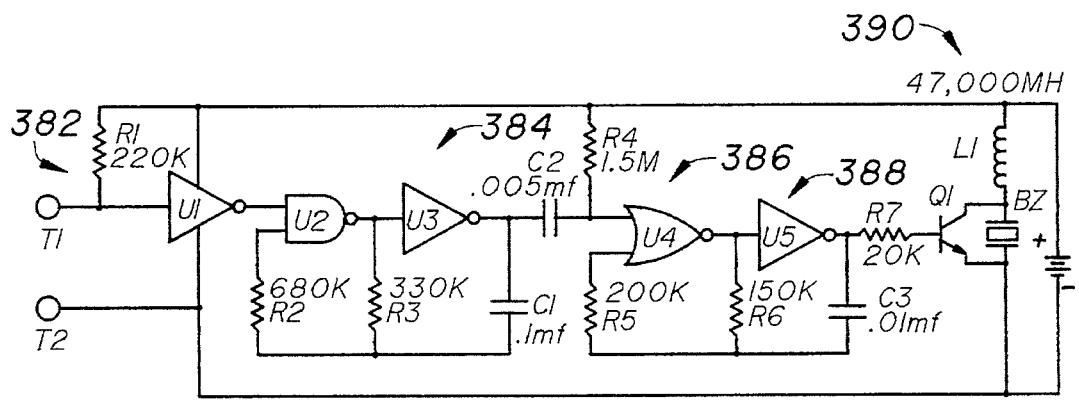
FIG. 24 is a circuit diagram of an electronic excitation circuit for the piezoelectric transducer of the operation device of FIG. 23.

Electronic excitation circuitry preferred for use with the module 350 is shown in FIG. 24. As shown, the circuit 380 is divided into five sections: a water switch 382, a first oscillator 384, an astable multivibrator 386, a second oscillator 388, and a driver 390. An inverting gate U1 may be part of a larger component that includes a number of gates (Motorola MC14572 hex gate or similar). The input to this gate is biased to the positive supply through a resistor R1 so that the input is normally high and the output low. When the input (T1) is shorted to the power supply common (T2), the output goes high and enables the next stage of the electronics. The value of R1 is chosen to be greater than the resistivity of water between the input points (T1 and 2) so that when the device is in the water, the circuit is enabled. In trials conducted to date, the resistance between T1 and T2 is greater than 500K ohms dry and drops to 100K ohms when wet. Consequently, R1 was set at 220K ohms.

The first oscillator 384 is composed of gates U2 and U3 and components R2, R3 and C1. The frequency of oscillation is nominally 12 hertz determined by 1/1.4(R3)C where R is measured in ohms and C is measured in farads.

The astable multivibrator 386 (one shot) is composed of C2 and R4 and gate U4. When the first oscillator output is asserted (goes high), the capacitor C2 charges as dictated by the RC time constant to the input threshold voltage of U4. This time is set to approximately six (6) milliseconds to produce a pronounced clicking sound from the piezoelectric transducer rather than a buzz or squeal.

The second oscillator 388 is composed of gates U4 and U5 and components R5, R6 and C3. The frequency of oscillation is nominally set to 600 hertz determined by 1/1.4(R6)C where R is measured in ohms and C in farads.

The driver 390 of the circuit is composed of R7, Q1 and choke L1 and is designed to excite the piezo material BZ to approximately 60 volts. Practical values of the components are indicated on FIG. 24.

To vary the repetition rate, a variable resistor might be used as R3. Similarly, the frequency of the sound may be varied using a variable resistor as R6. The volume may be varied by including some resistance in series with the choke L1.

The same design may be adapted to other lures including frog, duck or field mouse shapes to produce appropriate sounds. This adaptation may require changing the repetition rate of the sound (first oscillator R2, 3 and C1), the duration of the sound (C2 and R4) or the frequency (second oscillator R5, 6 and C3), or some combination of the three.

Figure 25:
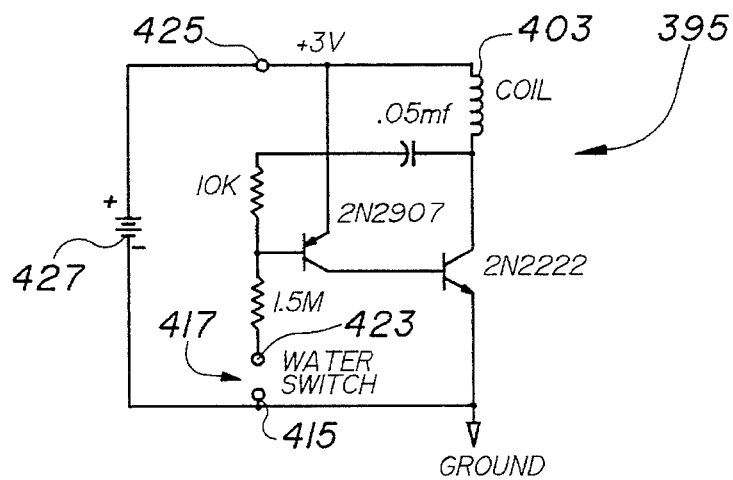
FIG. 25 is a circuit diagram similar to FIG. 5, but including a water switch.
Figures 26, 27:
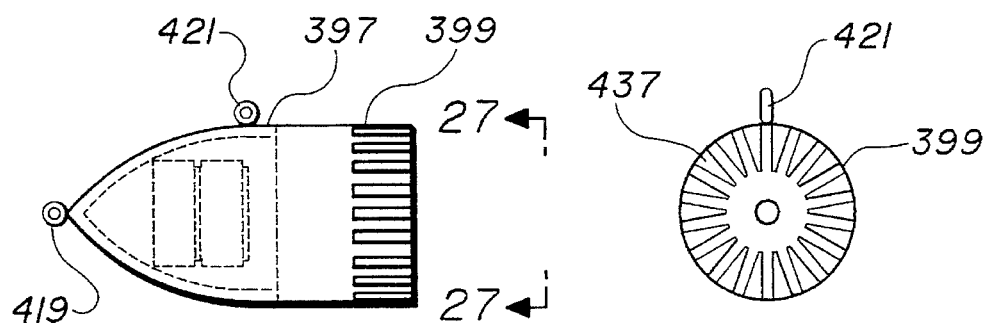
FIG. 26 is a view in side elevation of an electromechanical embodiment of a sound generating device of the invention incorporating the circuit of FIG. 25.
FIG. 27 is a view in rear elevation of the embodiment of FIG. 26, illustrating the structure of an end cap.

The arrangement illustrated by FIGS. 25–28 includes a circuit, designated generally 395 (FIG. 25) potted within a mass of resin (typically a moldable epoxy) with a desired exterior configuration 397 (FIG. 26) bonded to a separately molded end cap 399 (FIG. 27). For assembly, the circuit components shown by FIG. 25 are mounted to a printed circuit board 401 (FIG. 28) with the coil 403 of a transducer, designated generally 405, opposite the remaining components as shown.

A steel diaphragm 407 of the transducer 405 is bonded with a suitable adhesive to the magnet structure 409 of the transducer to prevent water from entering into the interior of the transducer 405. The diaphragm 407 may be entirely coated with adhesive or other suitable sealant to prevent corrosion.

A battery clip 415, which serves as a first contact of a water switch 417, is at ground potential in the circuit 395. A portion of the clip 415 is formed as a line attachment ring 419. A second line attachment ring 421 may be provided as shown, and is at the potential of a second contact 423 of the water switch 417. A battery terminal spring contact 425 biases a stack of batteries 427 against the clip 415, thereby to clamp them into position.

Figure 28:
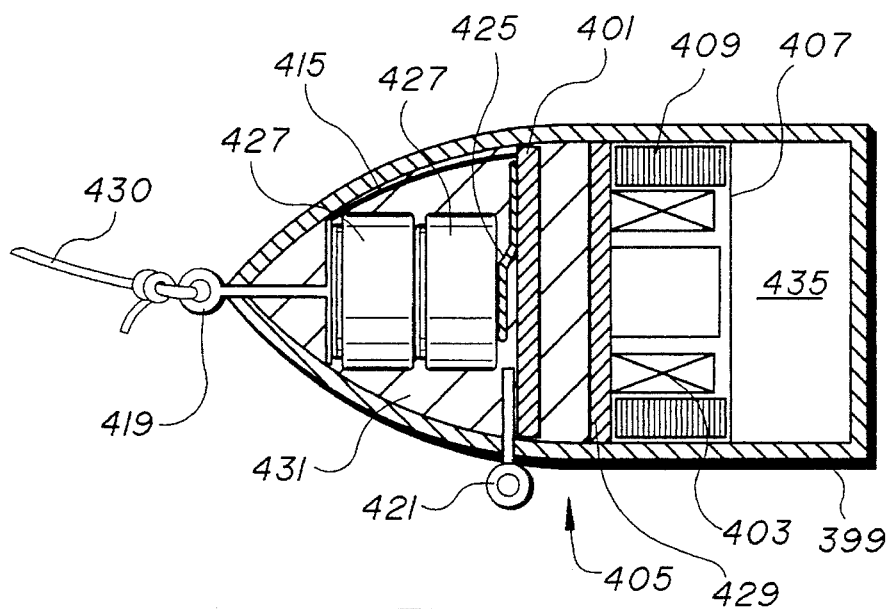
FIG. 28 is a view in cross section of the embodiment of FIG. 26, showing the arrangement of internal components.

The cap 399 is positioned over the diaphragm 407 end of the transducer 407 as shown by FIG. 28. The entire assembly forward of a ferrous metal flux plate 429 of the transducer 405 is then encapsuled with conventional potting resin 431 molded into a desired streamlined shape 397, leaving the conductive rings 419, 421 exposed. A conductive connection of these rings 419, 421 effects a closing of the water switch 417. In practice, the switch 417 will be in closed condition whenever the two rings 419, 421 are immersed in the water.

In use, the ring 419 is typically connected to a fishing line 430. Hooks or lures of any desired type or arrangement can the be connected to the ring 421. When the potted circuit 395 is submerged in the water, the contacts 419 and 423 are inevitably conductively connected to close the switch 417 and operate the transducer 405. Water enters the chamber 435 through openings 437 in the end cap 399. The diaphragm 407 is thereby directly coupled to the water to enhance the transmission of sound vibrations.

Figure 29:
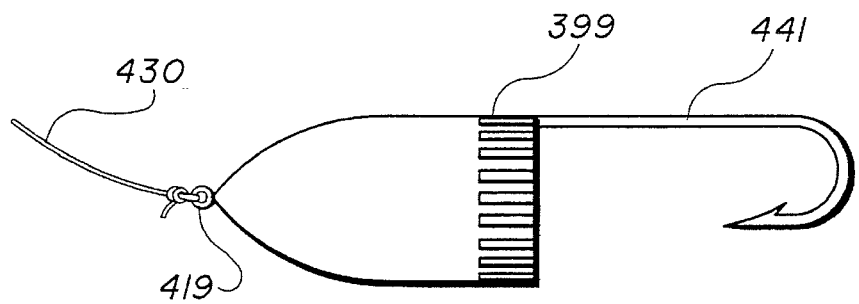
FIG. 29 is a view in elevation of an alternative physical embodiment of the device of FIGS. 25–28.

FIG. 29 illustrates an alternative structure in which a metallic hook 441 is included in the circuit 395 as a conductor to the switch contact 423. The shaft of the hook 441 may be embedded in to resin 431 along with the other components of the circuit 395.

Figure 30:
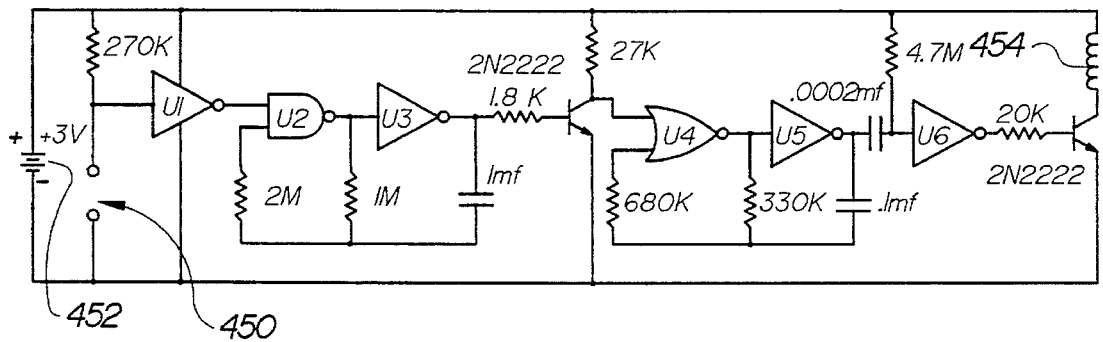
FIG. 30 is a diagram of a circuit useful for providing periods of pulsing sounds alternating with periods of silence.

The circuit illustrated by FIG. 30 is useful with electromechanical lures of this invention to provide periods of pulsing sounds, e.g. "beeps," alternating with periods of silence. The circuit may be constructed from a MC14572 hexgate component, (which includes the components U1–U6), by connecting other components as illustrated to the designated terminals. As illustrated, the circuit includes a water switch 450, batteries 452, and the coil 454 of a transducer, all generally as described in connection with FIGS. 23–28. The practical values illustrated produce alternating "on" and "off" cycles of a duration greater than approximately one second. A long term oscillator, comprising U2 and U3, provides on and off cycling of a second oscillator, comprising U4 and U5. The second oscillator sets the frequency to the coil 454 at approximately 800 hertz.

It is to be understood that the embodiments of the invention herein described are merely illustrative of the application of the principles of the invention. Reference herein to details of the illustrated embodiments is not intended to limit the scope of the claims which themselves recite those features regarded as essential to the invention.

What is claimed:

1. A fishing lure comprising:

a body having means for connecting at least one hook thereto;

operation means removably secured in said body, said operation means including a water-resistant container with an enclosing wall, securing means for securing said water-resistant container in said body, an oscillator circuit positioned within said water-resistant container to generate patterned electrical signals, battery means positioned within said water-resistant container to supply electrical power to said oscillator circuit, and luring means mechanically associated with said water-resistant container and connected to said oscillator circuit to receive said patterned electrical signals, said luring means being structured and arranged to generate fish-attracting action in response to said signals; and connecting means for connecting said body to structure operated by a remote operator.

2. The fishing lure of claim 1, wherein said battery means is at least one wristwatch-type battery, and wherein said water-resistant container has a first aperture through said wall to admit said battery means and closure means to close said first aperture.

3. The fishing lure of claim 2, wherein the said body has a diameter and a length and wherein the said water-resistant container is a cylinder of smaller diameter and length than those of said body.

4. The fishing lure of claim 3, wherein said water-resistant container is cylindrical with a first end, wherein said first aperture is formed in said first end and wherein said closure means is a plug insertable into said aperture.

5. The fishing lure of claim 3, wherein said luring means includes a coil with a moveable plunger positioned to contact said wall of said water-resistant container and said coil is connected to receive said patterned electrical signals and is operative to move said plunger away from and against said wall, whereby to make said fish-attracting sounds.

6. The fishing lure of claim 5, wherein said patterned electrical signals are signals transmitted at a preselected frequency.

7. The fishing lure of claim 2, wherein said luring means further includes:

a coil with a moveable plunger positioned proximate said coil and sized to contact the wall of said water-resistant container; and a spring interconnected between said plunger and said water-resistant container to urge said plunger toward said wall of said water-resistant container;

said coil being connected to receive said patterned electrical signals to move said plunger away from said water-resistant container and release said plunger for movement by said spring against said water-resistant container to generate fish-attracting sounds.

8. The fishing lure of claim 7, wherein said patterned electrical signals cause said coil to activate and said plunger to move at a preselected frequency in pulses at a preselected pulse repetition rate.

9. The fishing lure of claim 2, further including a second aperture formed through said wall of said water-resistant container and an extension attached to said plunger to snugly and movably extend through said aperture for reciprocating motion upon movement of said plunger whereby to impart fish-attracting motion to said water.

10. The fishing lure of claim 9, wherein said patterned electrical signals are coil activating signals transmitted at a preselected frequency at a preselected pulse repetition rate to cause said motion to be imparted at said preselected frequency at said preselected pulse repetition rate.

11. The fishing lure of claim 10, wherein said water-resistant container has a first end opposite a second end, wherein said first aperture is formed in said first end, wherein said second aperture is formed in said second end, and wherein said fishing lure includes a rubber-like boot positioned over said second end, said boot being secured to said extension for movement thereby.

12. The fishing lure of claim 10, wherein said water-resistant container includes a first end opposite a second end, wherein said second aperture is formed proximate said second end, wherein said fishing lure further includes a paddle extending through said second aperture and connected to said extension for movement by said plunger and wherein said fishing lure further includes a rubber-like boot sealably positioned about said paddle and said second aperture.

13. The fishing lure of claim 2, wherein said water-resistant container has a second aperture, wherein said luring means includes a coil with a moveable plunger interactively positioned for movement by said coil, said plunger having an extension to sealably and movably extend through said aperture for reciprocal motion upon movement of said plunger to impart fish-attracting motion to said water.

14. A fishing lure comprising:
a battery-powered, oscillating sound-generating module;
a lure body module including an exterior shaped as a fishing lure and an interior configured to receive said sound-generating module;
a battery associated with said sound-generating module and contained within said body module;
first and second conductors, each having a terminal end exterior said body module, remote from said battery, and a conductive end within said interior; and
means for securing said sound-generating module in said interior of said lure body module in operable association with said conductive ends of said first and second conductors.

15. The fishing lure of claim 14, wherein the battery-powered, oscillating sound-generating module includes a battery-powered oscillator circuit within a water-resistant container to generate and supply preselected patterned electrical signals.

16. The fishing lure of claim 14, wherein said sound-generating module is encapsulated with moldable resin, whereby to form said body module.

17. The fishing lure of claim 14, wherein said sound-generating module is removably secured within said body module, further including counterweight means structurally associated with said body module to maintain a desired center of gravity when said sound-generating module is secured within said body module.

18. A fishing lure comprising:
a battery-powered, oscillating sound-generating module;
a lure body module including an exterior shaped as a fishing lure and an interior configured to receive said sound-generating module;
first and second conductors, each having a terminal end exterior said body module and a conductive end within said interior; and
means for securing said sound-generating module in said interior of said lure body module in operable association with said conductive ends of said first and second conductors, wherein
said battery-powered oscillating sound-generating module includes:
a case;
a printed circuit board fitted in said case;
a printed circuit on said circuit board and inside said case;
a battery compartment formed in said case;
replaceable battery means in said battery compartment electrically coupling said battery means to said printed circuit;
oscillator means in said case; and
means for electrically connecting said oscillator means to said printed circuit.

19. The fishing lure of claim 18, further including means to vary the frequency of pulses produced by said oscillator means.

20. The fishing lure of claim 18, further including means to vary the duration of pulses produced by said oscillator means.

21. A fishing lure comprising:
a battery-powered, oscillating sound-generating module;
a lure body module including an exterior shaped as a fishing lure and an interior configured to receive said sound-generating module;
first and second conductors, each having a terminal end exterior said body module and a conductive end within said interior; and
means for securing said sound-generating module in said interior of said lure body module in operable association with said conductive ends of said first and second conductors, wherein
said terminal ends comprise a normally open switch which is placed into closed condition when said terminal ends are submerged in water, whereby to operate said sound-generating module.

22. The fishing lure of claim 21, further including means to vary the frequency of pulses produced by said oscillator means.

23. The fishing lure of claim 21, further including means to vary the duration of pulses produced by said oscillator means.

24. The fishing lure of claim 23, wherein said means to vary the duration of pulses comprises a variable volume sound chamber formed in said sound-generating module.

25. A fishing lure comprising:
a battery-powered, oscillating sound-generating module;
a lure body module including an exterior shaped as a fishing lure and an interior configured to receive said sound-generating module;
first and second conductors, each having a terminal end exterior said body module and a conductive end within said interior; and
means for securing said sound-generating module in said interior of said lure body module in operable association with said conductive ends of said first and second conductors, wherein said battery-powered, oscillating sound-generating module includes:

a choke coil connected to an oscillator circuit; and a piezoelectric membrane driven by said choke coil and forming a portion of the exterior surface of said sound-generating module.

26. A fishing lure of claim 25, constructed and arranged to permit direct coupling of said membrane and water when said lure is operated in water.

27. A fishing lure comprising:

a battery-powered, sound-generating device; contained within a body, including a front portion and a rear portion; and first and second conductors, extending from first and second terminals, respectively, of a normally open switch comprising said sound-generating device.

28. The fishing lure of claim 27, wherein the battery-powered, sound-generating device includes a battery-powered oscillator circuit within a water-resistant container.

29. The fishing lure of claim 28, wherein said sound-generating device is encapsulated with moldable resin, whereby to form said body.

30. The fishing lure of claim 29, wherein said body has an exterior configured as a fishing lure.

31. The fishing lure of claim 27, wherein said battery-powered oscillating sound-generating device includes:

a printed circuit board;

a printed circuit on said circuit board;

a battery holder mechanically associated with said circuit;

battery means held on one side of said circuit board by said battery holder, said battery means thereby being electrically coupled to said printed circuit; and vibrating means, comprising said circuit, being mounted to said circuit board opposite said battery means.

32. The fishing lure of claim 31, wherein all of the components of said sound-generating device mounted to said circuit board opposite said vibrating means are encapsulated in a moldable resin, whereby to form said front portion of said body and said rear portion of said body is structured as an end cap which encloses said vibrating means.

33. The fishing lure of claim 32, wherein said end cap is structured to permit water to flow into contact with said vibrating means when said lure is placed in water.

34. The fishing lure of claim 27, wherein at least one of said conductors extends to the exterior of said body and is configured as a fixture for connection of a fishing line.

35. A fishing lure comprising:

a battery-powered, sound-generating device;

contained within a body, including a front portion and a rear portion; and first and second conductors, extending from first and second terminals, respectively, of a normally open switch comprising said sound-generating device, wherein at least one of said conductors extends to the exterior of said body and is configured as a fixture for connection of a fishing line and one of said conductors is integral with a conductive hook.

36. The fishing lure of claim 34, wherein said battery-powered oscillating sound-generating device includes:

a printed circuit board;

a printed circuit on said circuit board;

a battery holder mechanically associated with said circuit;

battery means held on one side of said circuit board by said battery holder, said battery means thereby being electrically coupled to said printed circuit; and vibrating means, comprising said circuit, being mounted to said circuit board opposite said battery means.

37. The fishing lure of claim 36, wherein all of the components of said sound-generating device mounted to said circuit board opposite said vibrating means are encapsulated in a moldable resin, whereby to form said front portion of said body and said rear portion of said body is structured as an end cap which encloses said vibrating means.

38. The fishing lure of claim 37, wherein said vibrating means comprises a piezoelectric film, and said end cap is structured to permit water to flow into contact with said film when said lure is placed in water.

39. The fishing lure of claim 37, wherein said vibrating means includes:

a choke coil connected to an oscillator circuit; and a piezoelectric membrane driven by said choke and forming a portion of the exterior surface of said sound-generating device.

40. A fishing lure of claim 39, constructed and arranged to permit direct coupling of said membrane and water when said lure is operated in water.

41. The fishing lure of claim 40, wherein said membrane comprises a piezoelectric film with a curved surface.

42. A fishing lure comprising:

a body having means for connecting at least one hook thereto;

operation means secured in said body, said operation means including:

a water-resistant container, an oscillator circuit positioned within said water-resistant container to generate patterned electrical signals, battery means positioned within said water-resistant container to supply electrical power to said oscillator circuit, and luring means mechanically associated with said water-resistant container and connected to said oscillator circuit to receive said patterned electrical signals, counterweight means structurally associated with said body to maintain a desired center of gravity of said body; and connecting means for connecting said body to structure operated by a remote operator.

43. The fishing lure of claim 42, wherein said luring means includes a coil with a moveable plunger positioned to contact a wall of said water-resistant container and said coil is connected to receive said patterned electrical signals and is operative to move said plunger away from and against said wall, whereby to produce fish-attracting sounds.

44. The fishing lure of claim 43, wherein said luring means further includes:

a spring interconnected between said plunger and said water-resistant container to urge said plunger toward said wall of said water-resistant container;

said coil being connected to receive said patterned electrical signals to move said plunger away from said water-resistant container and release said plunger for movement by said spring against said water-resistant container to generate fish-attracting sounds.

45. The fishing lure of claim 44, wherein said patterned electrical signals cause said coil to activate and said plunger to move at a preselected frequency in pulses at a preselected pulse repetition rate.

46. The fishing lure of claim 42, wherein said luring means includes a vibrating membrane of an electromechanical oscillator constructed and arranged to be directly coupled to water when the lure is operated in water.

47. The fishing lure of claim 42, wherein said counterweight means includes said battery means.

48. The fishing lure of claim 47, wherein said counterweight is a vibrating means including said oscillator circuit.

49. A fish attracting battery-powered, sound-generating device contained within a body, said body including a front portion and a rear portion, said device comprising:

a normally open switch;

first and second conductors extending from first and second terminals, respectively, of said normally open switch.

50. A fish attracting battery-powered, sound-generating device as in claim 49, including a battery-powered oscillator circuit within a water-resistant container.

51. A fish attracting battery-powered, sound-generating device as in claim 50, wherein said sound-generating device is encapsulated with moldable resin whereby to form said body.

52. A fish attracting battery-powered sound generating device as in claim 49, including:

a printed circuit board;

a printed circuit on said circuit board;

a battery holder mechanically associated with said circuit;

battery means held on one side of said circuit board by said battery holder, said battery means thereby being electrically coupled to said printed circuit; and vibrating means, comprising said circuit, being mounted to said circuit board opposite said battery means.

53. A fish attracting battery-powered, sound-generating device as in claim 52, wherein all of the components of said sound-generating device mounted to said circuit board opposite said vibrating means are encapsulated in a moldable resin, whereby to form said front portion of said body and said rear portion of said body is structured as an end cap which encloses said vibrating means.

54. A fish attracting battery-powered, sound-generating device as in claim 53, wherein said end cap is structured to permit water to flow into contact with said vibrating means when said device is placed in water.

55. A fish attracting battery-powered, sound-generating device as in claim 49, wherein at least one of said conductors is configured as a fixture for connection of a fishing lure.

56. A fish attracting battery-powered, sound-generating device as in claim 49, including first attachment means for connecting said module to a line extending from remote support means floating atop water so that said module is suspended in said water, and second attachment means for connecting said module to a line extending from attachment to a fish luring means.

57. A fish attracting battery-powered, sound-generating device as in claim 56, wherein said support means is a boat and said luring means includes a fish hook.

\* \* \* \* \*